F. E. MARTIN.
FLUID PRESSURE CONTROL.
APPLICATION FILED MAR. 22, 1911.

1,004,541.

Patented Sept. 26, 1911.
3 SHEETS—SHEET 1.

Witnesses

F. E. Martin,
Inventor
by C.A.Snow & Co.
Attorneys

F. E. MARTIN.
FLUID PRESSURE CONTROL.
APPLICATION FILED MAR. 22, 1911.

1,004,541.

Patented Sept. 26, 1911.
3 SHEETS—SHEET 2.

Witnesses

F. E. Martin,
Inventor
by C. A. Snow & Co.
Attorneys

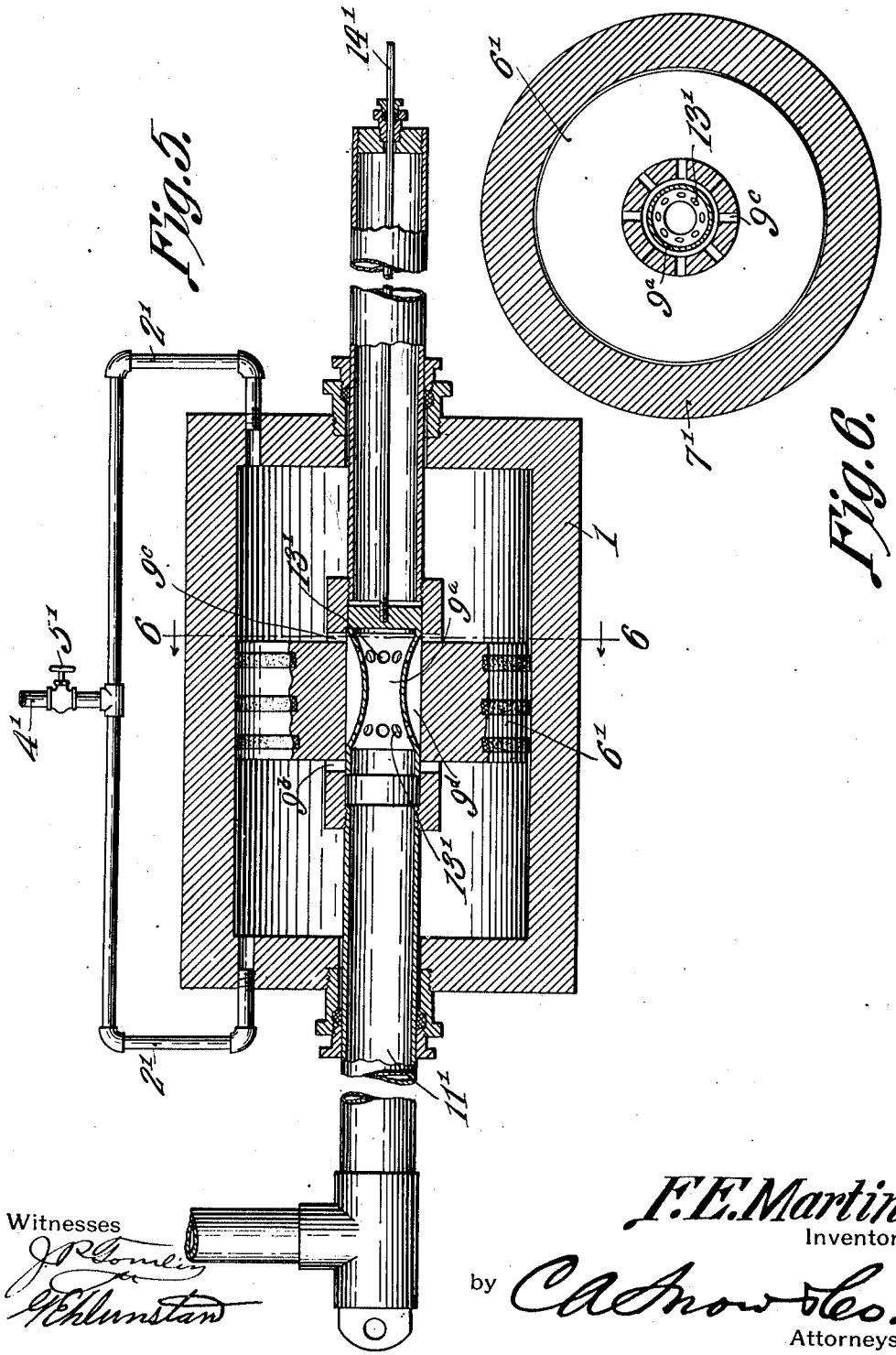

UNITED STATES PATENT OFFICE.

FREDERICK E. MARTIN, OF BONAMI, LOUISIANA.

FLUID-PRESSURE CONTROL.

1,004,541.

Specification of Letters Patent. Patented Sept. 26, 1911.

Application filed March 22, 1911. Serial No. 616,286.

*To all whom it may concern:*

Be it known that I, FREDERICK E. MARTIN, a citizen of the United States, residing at Bonami, in the parish of Calcasieu and State of Louisiana, have invented a new and useful Fluid-Pressure Control, of which the following is a specification.

This invention relates to a fluid pressure control and consists in the novel construction and arrangement of its parts as hereinafter shown, described and claimed.

The apparatus includes a cylinder in which a piston is mounted for reciprocation, said piston having a rod attached thereto, the end portions of which pass through the ends of the cylinder and the said rod is adapted to be connected with the object to be controlled or moved. A valve casing is located adjacent the cylinder and the cylinder is provided with a number of ports which communicate with the interior of the casing. A valve is slidably mounted in the valve casing and means is provided whereby the said valve may be manually moved with relation to the piston to open the ports beyond one or the other end of the piston whereby the fluid pressure which is in the cylinder at the opposite ends of the piston is for a time rendered unequal thereby causing the said piston to move within the cylinder and follow the valve.

Figure 1:
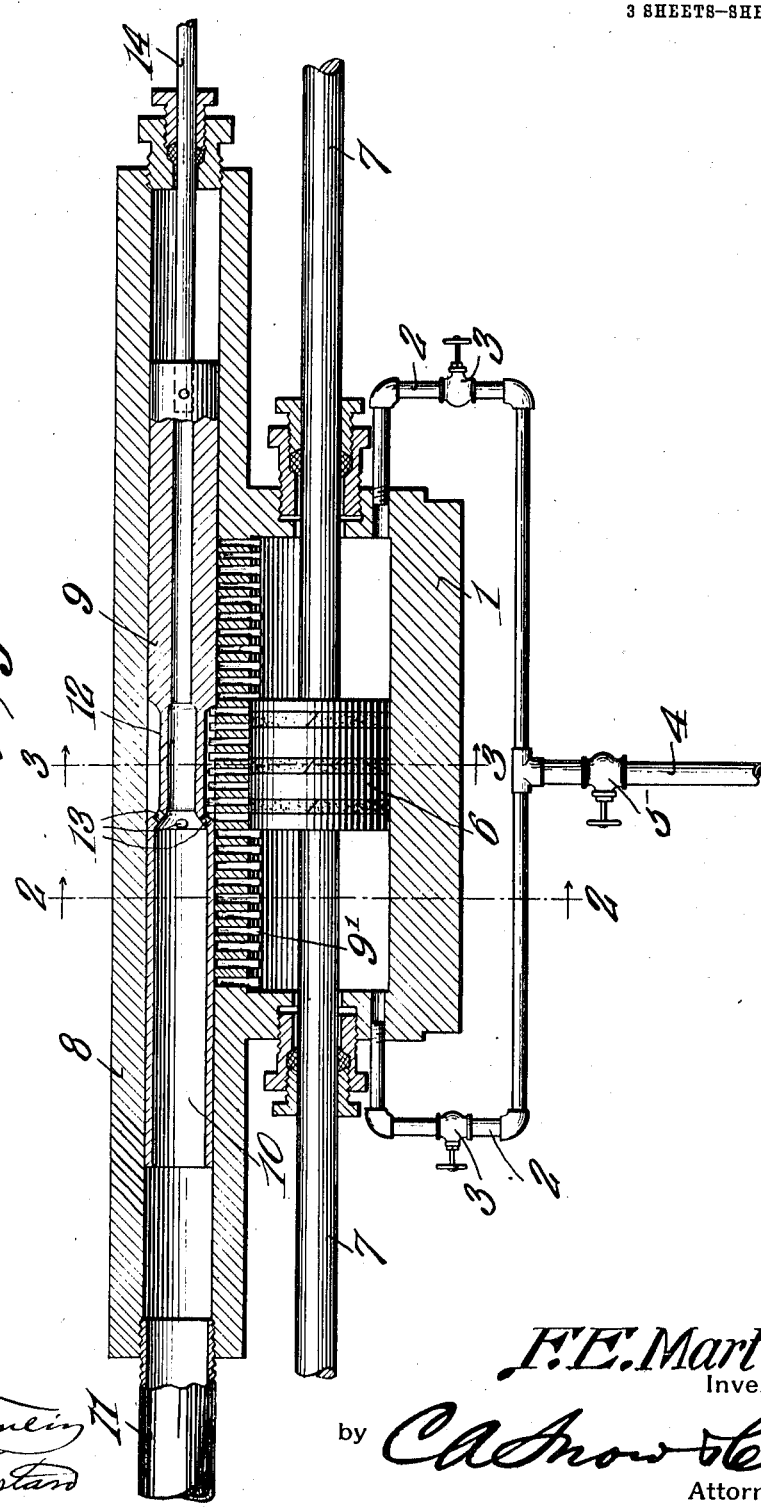
Figures 2, 3:
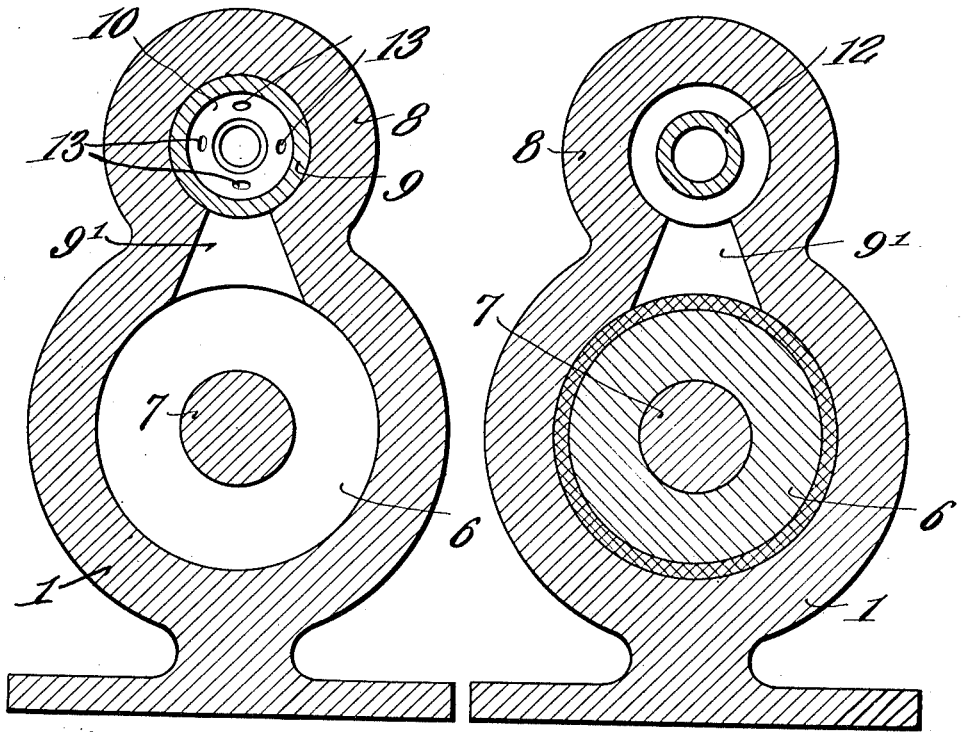
Figure 4:
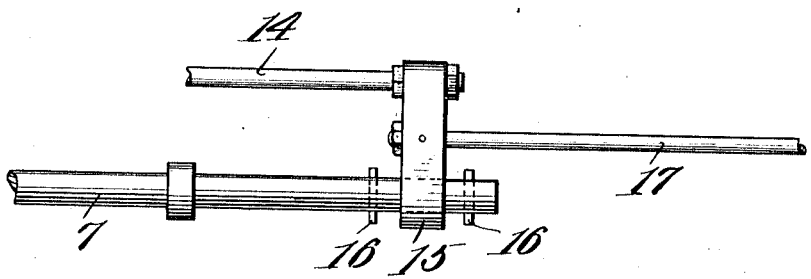

In the accompanying drawings:—Figure 1 is a longitudinal sectional view of the fluid pressure control. Fig. 2 is a transverse sectional view of the same cut on the line 2—2 of Fig. 1. Fig. 3 is a transverse sectional view of the same cut on the line 3—3 of Fig. 1. Fig. 4 is a plan view of a portion of the fluid pressure control device. Fig. 5 is a view similar to Fig. 1 showing a modified construction. Fig. 6 is a transverse section on the line 6—6 of Fig. 5.

The device consists of a cylinder 1 having steam or other fluid pressure pipes 2 communicating with its ends. The pipes 2 are provided with valves 3 which may be mounted upon the said pipes at any desired point and the steam or fluid pressure is led to the said pipes 2 from a common supply pipe 4. The pipe 4 is also provided with a valve as for instance that indicated at 5 in Fig. 1 of the drawings.

A piston 6 is mounted for reciprocation in the cylinder 1 and a piston rod 7 is fixed to the said piston and projects through and beyond the ends of the cylinder 1. It is to the said piston rod 7 that the object to be controlled or moved is attached. A valve casing 8 is located adjacent the cylinder 1 and the said cylinder is provided in its top with a number of ports 9' which communicate both with the interior of the cylinder and the interior of the said valve casing. A slidable valve 9 is mounted in the casing 8 and the said valve at one end is hollow as at 10, which hollow communicates with the interior of the said casing 8 and the casing in turn is provided with an exhaust pipe 11. At a point approximately midway between its ends the valve 9 is provided with a reduced portion 12 and at the end of the said portion 12 the valve 9 is provided with ports 13 which establish communication between the space between the said reduced portion 12 and interior wall of the casing 8 and the hollow 10 provided in the said valve. A stem 14 is attached to the valve 9 and projects through and beyond one end of the casing 8. A yoke 15 is fixed to the valve stem 14 and the said yoke slidably receives the end portion of the piston rod 7. The said piston rod is provided with spaced stops 16 which are located in the path of movement of the yoke 15 and are adapted to limit sliding movement of the said yoke with relation to the rod 7. A controlling rod 17 is fixed to the yoke 15 and the said controlling rod 17 is adapted to be manually moved or manipulated. When the rod 17 is moved longitudinally and the yoke 15 is moved into engagement with one of the stops 16 the rod 7 will be moved in the same direction as that in which the rod 17 is moving.

The operation of the device is as follows: Presuming that the parts are in the relative positions as illustrated in Fig. 1 of the drawings and steam or other fluid pressure is admitted into the opposite ends of the cylinder through the pipes 2 the steam pressure is equalized at the opposite ends of the said cylinder and upon the opposite ends of the piston 6 and consequently the said piston is balanced in its position in the cylinder and will not move longitudinally thereof. Presuming now that it is the desire to have the piston 6 and the rod 7 to which it is attached moved toward the right, an operator grasps the rod 17 and moves the same toward the right whereby the yoke 15 is caused to slide along the piston rod 7 toward the outermost stop 16. This movement on the part of the yoke 15 moves the valve stem 14 longitudinally which in turn moves the valve 9 in the casing 8 and the intermediate reduced portion 12 of the said valve is moved so that its end portion projects beyond the end of the piston 6. As soon as this is done some of the ports 9' immediately beyond the right hand end of the piston 6 are uncovered and the fluid pressure in the right hand end of the cylinder 1 escapes through the said uncovered port and the space between the reduced portion 12 and the inner surface of the casing 8, the ports 13, the hollow 10 and out through the exhaust 11. This reduces the pressure of the fluid at the right hand end of the cylinder and the excessive pressure of the fluid at the opposite end of the cylinder will operate upon the piston 6 and move the same toward the right hand end of the cylinder until the said piston covers the lower ends of the ports 9' in the top of the cylinder which are uncovered by the reduced portion 12 of the valve 9. It of course will follow that so long as the rod 17 and the yoke 15 are moved toward the right and the piston rod 7 follows the said yoke the piston 6 will continue to move toward the right in the cylinder 1 and therefore it will be seen that by the exercise of comparatively slight manual energy the expansion of the fluid under pressure is taken advantage of to move a comparatively heavy load through the piston and the piston rod. Thus the object that is moved is controlled in so far as its location is concerned.

It is obvious if instead of moving the rod 17 to the right that should the said rod be moved to the left the reverse of the operation hereinbefore described will take place and the piston and its rod will be moved toward the left hand end of the cylinder 1 instead of to the right.

The modified construction illustrated in Figs. 5 and 6 of the drawing is substantially the same as that shown in Fig. 1 except that the controlling valve mechanism is mounted inside the piston and piston rod. 4' indicates the fluid pressure supply pipe and 5' the controlling valve. In place of the adjusting valve 3 shown in Fig. 1, the branch supply pipes 2'—2' are made smaller in diameter, or constricted, the amount of the constriction depending upon the degree of pressure which it is desired to supply to opposite sides of the piston. The piston 6' is mounted in the cylinder 1' and has in the central portion thereof a valve chamber in which is slidably mounted the valve 9ª, this valve being controlled by the valve stem 14' in the same manner as the valve 9 in Fig. 1. In place of the ports 9' shown in Fig. 1, the ports 9ᵇ and 9ᶜ are employed, the port 9ᵇ being intended to throw the valve chamber 9ᵈ into communication with the space at one side of the piston 6' and the ports 9ᶜ being intended to throw said valve chamber into communication with the space on the opposite side of said piston. The valve 9ª is so arranged that when it is moved to the left in Fig. 5 it opens the ports 9ᵇ and lowers the pressure on the left side of the piston 6' thus causing said piston to move to the left. When the valve 9ª is moved to the right in Fig. 5, it opens the right hand ports 9ᵇ and thus lowers the pressure on the right side of the piston, causing said piston to move to the right, the valve 9ª moving therewith. The pressure, of course, exhausts through the ports 9ᶜ and then through the port 13' in the valve 9ª and from thence through the exhaust passage 11'. When the valve 9ª has been moved to the right in Fig. 5 by means of the stem 14', it remains in that position and travels with the piston 6' which continues to move to the right in the cylinder 1' until the operator moves the valve stem 14', or rather, holds it against further movement with the result that the valve 9ª is moved into position to close both the ports 9ᶜ and 9ᵇ, whereupon the piston 6' comes to a standstill and remains in that position until the valve 9ª is again moved. When the parts are in the position shown in Fig. 5, if the valve stem 14' be moved to the left by means of any suitable handle, the piston 6' immediately starts toward the left carrying with it the valve 9ª which through the valve stem 14' causes the operating handle (not shown) to move continuously to the left, and this leftward movement continues until the operator stops the movement of the valve stem 14' which thus restores the valve 9ª to its intermediate position and causes the valve 6' to come to a standstill and remain in that position.

Having described the invention what I claim as new and desire to secure by Letters Patent is:—

1. A control device comprising a cylinder, a piston mounted for reciprocation therein, a pipe connected to each end of the cylinder for admitting a fluid pressure element into the cylinder at the opposite ends of the piston at uniform pressure, and means for reducing the pressure of the fluid pressure element in the cylinder at one end of the piston whereby the piston will be forced toward said end of the cylinder on account of the greater pressure at the other end of the piston.

2. A control device comprising a cylinder, a piston mounted for reciprocation in the cylinder, a rod attached to the piston and projecting through the ends of the cylinder, a pipe and branch pipes leading therefrom connected to the ends of the cylinder for admitting a fluid pressure element into the opposite ends of the cylinder at uniform pressure, a valve casing located adjacent the cylinder, the cylinder having ports which communicate with the interior of the valve casing, a valve slidably mounted in the valve casing and having a reduced intermediate portion and provided with an exhaust hollow and having ports which communicate with the space between the casing and the reduced portion of the said valve and the said exhaust hollow.

3. A control device comprising a cylinder, a piston mounted for reciprocation in the cylinder, a rod attached to the piston and projecting through the ends of the cylinder, a pipe and branch pipes leading therefrom connected to the ends of the cylinder for admitting a fluid pressure element into the opposite ends of the cylinder at uniform pressure, a valve casing located adjacent the cylinder, the cylinder having ports which communicate with the interior of the valve casing, a valve slidably mounted in the casing and adapted when moved to uncover some of the said ports to permit the escape of the fluid pressure from one end of the piston, and means whereby the said valve may be moved manually.

4. A control device comprising a cylinder, a piston mounted for reciprocation in the cylinder, a rod attached to the piston and projecting through the ends of the cylinder, a pipe and branch pipes leading therefrom connected to the ends of the cylinder for admitting a fluid pressure element into the opposite ends of the cylinder at uniform pressure, a valve casing located adjacent the cylinder, the said cylinder having ports which communicate with the interior of the valve casing, a valve slidably mounted in the casing and having at its end an exhaust hollow, the valve being provided with a reduced intermediate portion and having ports which communicate with its hollow and the space between the said reduced portion and the side of the casing, a yoke fixed with relation to the valve and slidably engaging the piston rod, stops mounted upon the piston rod and adapted to limit the sliding movement of the yoke, and an operating rod attached to the yoke.

5. A control device comprising a cylinder, a piston mounted for reciprocation therein, a pipe connected to each end of the cylinder for admitting a fluid pressure element at uniform pressure at the ends of the cylinder, a valve casing having ports which communicate with the cylinder a valve located in the casing and adapted when moved to uncover some of said ports to permit the escape of the fluid pressure from one end of the piston and means for moving the valve whereby the pressure in the cylinder will cause the piston to follow the valve and to become locked by the pressure in the cylinder when the movement of the valve ceases.

In testimony that I claim the foregoing as my own, I have hereto affixed my signature in the presence of two witnesses.

FREDERICK E. MARTIN.

Witnesses:
F. B. OCHSENREITER,
LENA WILLSON.